Nov. 13, 1956 R. URTEL 2,770,730

FREQUENCY CONTROL CIRCUIT

Filed July 23, 1953 3 Sheets-Sheet 1

INVENTOR
R. URTEL
Philip M. Bolton
ATTORNEY

Nov. 13, 1956 R. URTEL 2,770,730

FREQUENCY CONTROL CIRCUIT

Filed July 23, 1953 3 Sheets-Sheet 2

INVENTOR
R. URTEL
Philip M. Bolton
ATTORNEY

Nov. 13, 1956 R. URTEL 2,770,730

FREQUENCY CONTROL CIRCUIT

Filed July 23, 1953 3 Sheets-Sheet 3

INVENTOR
R. URTEL
Philip M. Bolton
ATTORNEY

United States Patent Office 2,770,730

Patented Nov. 13, 1956

2,770,730

FREQUENCY CONTROL CIRCUIT

Rudolf Urtel, Pforzheim, Germany, assignor to International Standard Electric Corporation, New York, N. Y., a corporation of Delaware Application July 23, 1953, Serial No. 369,791

Claims priority, application Germany July 25, 1952

3 Claims. (Cl. 250—36)

Frequency control circuits are well known whereby a local oscillator is so controlled by a synchronizing frequency that the synchronization frequency and the oscillator frequency are both impressed upon a phase measuring device which supplies, in the case of deviation of the frequencies from one another, a controlling entity voltage for retuning of the oscillator frequency. Such arrangements are being utilized in the case of frequency measurements, with quartz clocks and in television; in the latter case for synchronization of horizontal scanning in the receiver or for re-adjustment of the frame repetition frequency to the frequency of the supply line at the sending side.

The invention relates to an improvement of the above described frequency control circuits.

In accordance with an aspect of my invention, there is provided a phase shifter which is co-controlled by the control voltage of the phase measuring device.

The above mentioned and other features and other objects of this invention and the manner of attaining them will become more apparent and the invention itself will be best understood, by reference to the following description of an embodiment of the invention taken in conjunction with the accompanying drawings, wherein.

Figure 1:
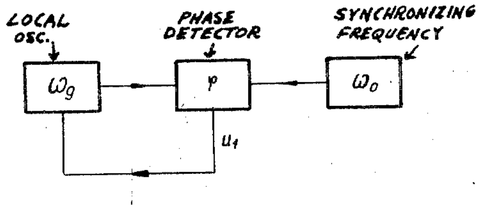
Fig. 1 is a block schematic of a known phase control circuit arrangement.

The basic circuit design of a known frequency control circuit arrangement is shown in Fig. 1, whereby $\omega_0$ represents the source of a synchronizing frequency and $\omega_g$ designates the local generator. The A. C. voltages of the two frequencies are passed to a phase measuring device $\varphi$ which furnishes a D. C. voltage $u_1$ which is independent of phase. This voltage is impressed upon the frequency retuning arrangement of the local generator. This frequency retuning arrangement may, for instance, comprise a reactance tube in the case of sine-wave-generators, or a bias variation circuit in the case of relaxation oscillators. The phase varies with the differential frequency $$d\phi/dt=\omega g-\omega_0$$

Figure 2:
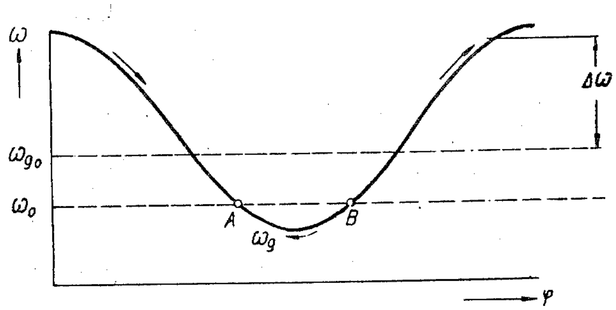
Fig. 2 is a diagram used in explaining the function of Fig. 1.

Assuming the most simple conditions for the phase meter $$u_1=u_0\cos\phi$$

and the frequency control $$\omega_g=\omega_0+\Delta\omega\frac{u_1}{u_0}=\omega_{g_0}+\Delta\omega\cos\phi$$

wherein $$\omega_{g_0}$$

represents the uncontrolled frequency and $\Delta\omega$ the control swing; then the theory of operation follows from Fig. 2. If $\omega_g<\omega_0$, then $d\varphi/_{dt}<0$.

The phase must decrease with increasing time; for $$\omega/_\delta>0$$

however, the phase is seen to increase. It follows therefore, that, of the two possible positions A and B in which the generator frequency equals the specified frequency $$\omega/_\delta=\omega_0$$

only the position A will be stable.

Figure 3:
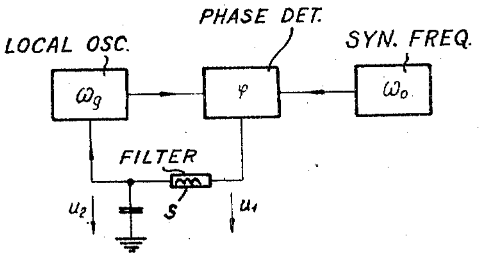
Fig. 3 is a block schematic of a known arrangement with a filter element for the control entity.

In practice, difficulties arise from the fact that in smoothing the voltage $u_1$ delivered from the phase measuring unit, a filter element is required. In the case of television synchronization, such a filter element will provide protection of the arrangement from spurious disturbances because the control voltage which becomes active at the local generator is formed by integration over a greater number of synchronizing pulses ($\omega_0$). Such a filter element is designated as S in Fig. 3. In this figure, $\omega_0$ again stands for the source of the synchronizing frequency $\omega_g$, for the local generator to be synchronized, and $\varphi$ is the phase measuring unit. With the circuit according to Fig. 3, the local generator is controlled by the voltage $u_2$ subsequent to the filter element S which voltage is inter-linked with the mean voltage $u_1$ before the filter element according to the formula $$u_1=u_2+\tau\frac{du_2}{dt}$$

Figure 4:
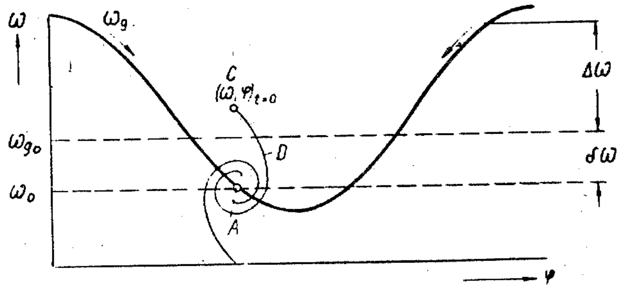
Fig. 4 is a diagram used in explaining the function of Fig. 3.

$\tau$ is the time constant of the filter element which consists of capacitor and resistor. The addition of the filter element, however, leads to undesirable transient oscillations as represented in Fig. 4. The frequency $\omega$ and the phase $\varphi$ are no longer rigidly interlinked by the control characteristic so that in the case of a spurious disturbance (change in the generator frequency $\omega_g$, or the synchronizing frequency $\omega_0$, or in the case of an occurring spurious pulse) the arrangement with regard to its oscillations will find its stable point at A. That is, the control curve does not trace a straight line from a starting point C at the time $t=0$ to the stable point A, but it will instead oscillate toward this point A over a helical curve.

Thus it is seen, that elimination of the disturbances while maintaining transients at a minimum, produces conflicting considerations. Where elimination of disturbances is improved by increasing the time constant, attenuation of the transient build-up decreases. The non-linear differential equation for the process reads as follows:

$$\frac{d^2\phi}{dt^2}+\frac{1}{\tau}\frac{d\phi}{dt}-\frac{\Delta\omega}{\tau}\cos\phi d\omega=0$$

which may be simplified in the case of $d\omega=0$ for the surrounding range of point A $$\phi=\pi/2$$

in the formula:

$$\frac{d^2\phi}{dt^2}+\frac{1}{\tau}\frac{d\phi}{dt}+\frac{\Delta\omega}{\tau}\cdot\phi=0$$

It will be recognized that attenuation of the process (coefficient of the first derivation) decreases with increasing $\tau$. A more complicated by-phenomenon occurs in that with larger values of $\tau$ the arrangement will perform continuous control oscillations upon switching on or in the case of strong disturbances, despite the fact that the specified frequency lies in the control range. "Catching," i. e. re-stabilization occurs only within a smaller frequency range that would correspond to the control range.

Figure 5:
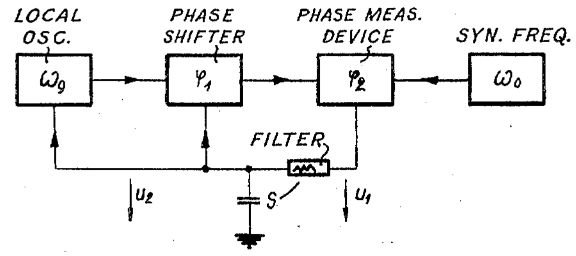
Fig. 5 is the basic circuit arrangement of the invention.

In accordance with my invention, this fixed interconnection between the time constant and attenuation is eliminated so that a larger time constant with a larger attenuation is possible. Accordingly, there is coupled in the lead of one of the two frequency sources, preferably in the lead from the local generator to the phase measuring unit, a phase shifter which is co-controlled by the same control voltage that regulates the local generator. The principal circuit arrangement of the control forming the basis of my invention is represented in Fig. 5. $\omega_0$ Depicts the synchronizing frequency source, $\omega_g$ the generator to be synchronized, $\varphi_2$ the phase measuring unit, $\varphi_1$ the phase shifter and S filter element. This circuit may be expressed in terms of a differential equation which reads in simplified form (surrounding area of the stable point for $\delta\omega=0$:

$$\frac{d^2\phi}{dt^2}+\frac{(1+\Delta\phi)}{\tau}+\frac{\Delta\omega}{\tau}\phi=0$$

It follows from the component $$\frac{1+\Delta\phi}{\tau}$$

that the attenuation can be influenced not only by the time constant, but also by the sensitivity of the phase shifter $$\left(\phi_1=d\phi\frac{u_1}{u_0}\right)$$

Figure 6:
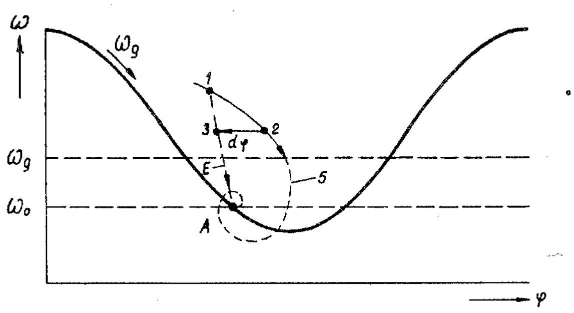
Fig. 6 is a diagram used in explaining the function of Fig. 5.

The function of this arrangement is shown in Fig. 6. Without the additional phase control $\varphi$ the process would follow the path 1, 2 of the curve towards the stable point A as has been explained with reference to Fig. 4. With the addition of the phase shifter $\varphi$ there is effectuated, upon control $d\omega$, an additional phase control $d\varphi$ from 2 to 3, so that the process can be traced along the path 1—3, of curve E, i. e., it drives with larger attenuation directly towards A.

Figure 7:
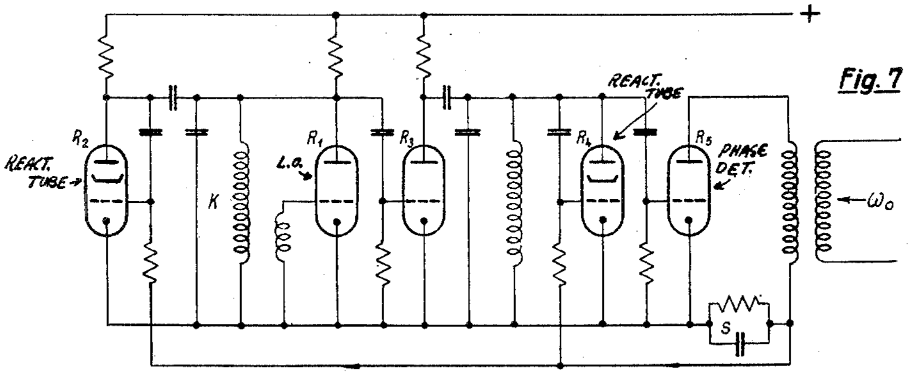
Fig. 7 is a schematic of a practical design example of the invention.

Fig. 7 shows a schematic circuit diagram of a practical embodiment of the invention. $R_1$ is a local generator to be synchronized to the master frequency $\omega_0$; the frequency of this generator is governed by the circuit K whose characteristics are varied by the reactance tube $R_2$. The tube $R_5$ is a phase controlled rectifier which delivers the control voltage for the reactance tube 2 for retuning of the generator frequency.

S is the filter element for the control voltage. The tubes $R_3$ and $R_4$ constitute the phase shifter. The tube $R_3$ thereby functions as a coupling tube which feeds the generator frequency from the tube $R_1$ to the tube $R_5$. The plate circuit of the coupling tube $R_3$ can be detuned by the reactance tube $R_4$, so that the phase of the generator voltage as passing to the phase measuring unit (tube $R_5$) is thereby shifted. The reactance tube $R_4$ proper is likewise controlled by the control voltage of the phase measuring tube $R_5$.

By way of example, in television the saw-tooth generator is controlled by means of synchronizing pulses. There is thus being compared in this case a narrow rectangular synchronizing pulse with a saw-tooth pulse, in the phase measuring unit. The stable phase is adjusted so as to coincide with the steep edge (retracing portion) of the saw-tooth pulse since in the case of horizontal synchronisation small phase fluctuations are already of essential bearing. "Virtual" phase shifting may also be employed with this procedure.

Figure 8:
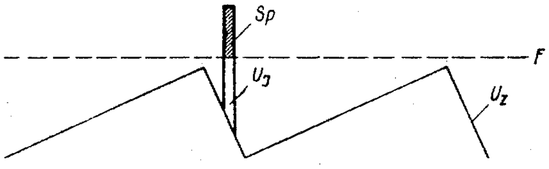
Fig. 8 shows a synchronizing pulse superimposed upon a saw-tooth voltage.

In Fig. 8 there is shown a voltage diagram where $U_z$ designates the saw-tooth voltage from the local generator and $U_I$ designates the pulse voltage of the synchronizing pulses. A fixed threshold voltage F eliminates the pulse-peaks *Sp*; from these peaks a controlling D. C. voltage may be derived for readjustment of the saw-tooth oscillator. If there occurs relative shifting of the phases of pulse voltage to saw-tooth voltage, this will then produce a strong variation in the controlling D. C. voltage and function of the position of the pulse on the steep edge of the saw-tooth curve.

It is thus possible to attain a "virtual" phase shift in such a manner that the zero line of the saw-tooth voltage is shifted by an additional D. C. voltage, i. e., the saw-tooth is lifted or lowered by a supplementary D. C. voltage, a measure which, in effect, is like a phase shift between pulse and saw-tooth because it produces variation of the pulse peak *Sp*, i. e. the control voltage.

Figure 9:
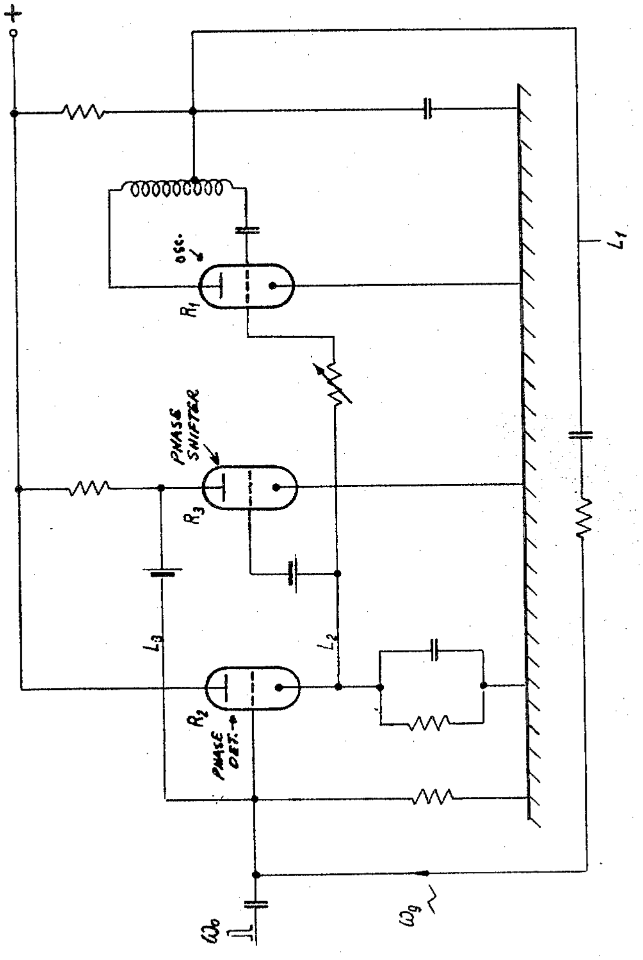
Fig. 9 is another design example for synchronization of a saw-tooth generator, as in a television receiver.

This principle is applied in a design example shown by Fig. 9, whereby the phase shifter between the oscillator voltage and phase measuring device is formed by such a D. C. bias shift. In Fig. 9 $R_1$ represents a conventional oscillator (saw-tooth generator). $R_2$ is the phase measuring tube to the grid of which there is fed on the one hand the rectangular synchronizing pulses $\omega_0$ and, on the other hand and over the lead $L_1$ the saw-tooth voltage $\omega_g$ from the generator $R_1$. There is then created in known manner in the cathode circuit of tube $R_2$ the control voltage which is applied for the purpose of re-controlling of the frequency over the line $L_2$ to the grid of the generator tube $R_1$. The control voltage is also simultaneously applied to the grid of tube $R_3$, this tube operating as the phase shifter. The tube $R_3$ is a D. C. amplifier and the D. C. voltage generated in the plate circuit of tube $R_3$, being a function of the applied grid voltage, is again applied over the lead $L_3$ to the grid of the phase measuring tube $R_2$. This produces a change in the bias voltage of the tube $R_2$ and a "virtual" phase shift between saw-tooth voltage and synchronizing pulse voltage which effectuates the $d\varphi$-shift was described above with reference to Fig. 6.

While I have described above the principles of my invention in connection with specific apparatus, it is to be clearly understood that this description is made only by way of example and not as a limitation of the scope of my invention as set forth in the objects thereof and in the accompanying claims.

What is claimed is:

1. A frequency control circuit comprising a local oscillator, a source of synchronizing signals, a phase measuring device, means applying the local oscillations and said synchronizing signals to said phase measuring device, said phase measuring device producing a control voltage in response to a phase difference in said applied frequencies, and means applying said control voltage to said local oscillator to correct said deviations, and characterized by means for more rapidly and directly correcting said deviations comprising a phase shifting device coupled between the output of said local oscillator and the input of said phase measuring device, and means applying said control voltage to said phase shifting device, whereby said control voltage is applied simultaneously to said local oscillator and said phase shifting device.

2. The control circuit according to claim 1, wherein said phase shifting device comprises a reactance tube and said control voltage is applied to said reactance tube.

3. The control circuit according to claim 1, wherein said phase shifting device comprises a coupling electron tube having its input coupled to the output of said local oscillator, and a reactance tube coupled between the output of said coupling tube and the input of said phase measuring device, said control voltage being applied to the reactance tube, whereby the phase shifting is effected by said coupling tube in response to the changes produced by said reactance tube.

References Cited in the file of this patent

UNITED STATES PATENTS

| | | |
|---|---|---|
| 2,274,434 | Sheaffer | Feb. 24, 1942 |
| 2,379,689 | Crosby | July 3, 1945 |
| 2,473,790 | Crosby | June 21, 1949 |
| 2,541,454 | White et al. | Feb. 13, 1951 |
| 2,588,094 | Eaton | Mar. 4, 1952 |